US009393722B2

(12) United States Patent
Yamashita et al.

(10) Patent No.: US 9,393,722 B2
(45) Date of Patent: Jul. 19, 2016

(54) METHOD OF PRODUCTION OF WEB MEMBER INCLUDING TOW

(71) Applicant: UNICHARM CORPORATION, Ehime (JP)

(72) Inventors: Yuji Yamashita, Kanonji (JP); Kazuhiko Hoshika, Kanonji (JP); Hiroyoshi Takada, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 13/749,715

(22) Filed: Jan. 25, 2013

(65) Prior Publication Data

US 2014/0190626 A1 Jul. 10, 2014

(30) Foreign Application Priority Data

Jan. 10, 2013 (JP) .................. 2013-002857

(51) Int. Cl.
*B29C 65/00* (2006.01)
*B29C 43/20* (2006.01)
(Continued)

(52) U.S. Cl.
CPC .............. *B29C 43/203* (2013.01); *B32B 5/022* (2013.01); *B32B 5/08* (2013.01); *B32B 5/26* (2013.01); *D04H 3/005* (2013.01); *D04H 3/02* (2013.01);
(Continued)

(58) Field of Classification Search
CPC ........ B29C 43/203; D04H 3/005; D04H 3/02; D04H 3/08; B32B 5/022; B32B 2432/00; B32B 5/26; B32B 2250/20; B32B 2262/0253; B32B 2262/0284; B32B 2262/12; B32B 5/08

USPC ........ 100/35, 41, 151, 152; 53/523, 526, 529; 156/228, 265, 253, 312, 580, 581, 156/DIG. 42
See application file for complete search history.

(56) References Cited

U.S. PATENT DOCUMENTS 345,644 A 7/1886 Moseman
470,898 A 3/1892 Reiffel
(Continued)

FOREIGN PATENT DOCUMENTS

EP 0546580 6/1993
EP 2009152 12/2008
(Continued)

OTHER PUBLICATIONS

Office Action mailed Apr. 29, 2015, corresponding to U.S. Appl. No. 13/749,717.
(Continued)

*Primary Examiner* — Jacob T Minskey
*Assistant Examiner* — Vishal I Patel
(74) *Attorney, Agent, or Firm* — Hauptman Ham, LLP

(57) ABSTRACT

The method of production of a web having a tow according to the present invention has a transfer step of transferring a product form web member which is formed by a continuous web member being cut, which product form web member is configured having a plurality of fibrous members formed from tows, to a packaging step which packages the product form web member, the transfer step has a stacking step of stacking a plurality of product form web members to form a stacked member and a variation correction step of suppressing variation of bulk of the stacked member by pressing the stacked member from above the stacked member.

3 Claims, 5 Drawing Sheets

(51) Int. Cl.
*D04H 3/005* (2012.01)
*D04H 3/02* (2006.01)
*D04H 3/08* (2006.01)
*B32B 5/02* (2006.01)
*B32B 5/08* (2006.01)
*B32B 5/26* (2006.01)

(52) U.S. Cl.
CPC .............. *D04H 3/08* (2013.01); *B32B 2250/20* (2013.01); *B32B 2262/0253* (2013.01); *B32B 2262/0284* (2013.01); *B32B 2262/12* (2013.01); *B32B 2432/00* (2013.01)

(56) References Cited

U.S. PATENT DOCUMENTS

| | | |
|---|---|---|
| 1,847,065 A | 2/1932 | Munch |
| 1,989,048 A * | 1/1935 | Winter .................. B65H 29/12 100/154 |
| 2,733,064 A | 1/1956 | Martin |
| 2,738,973 A | 3/1956 | Koch |
| 2,836,418 A | 5/1958 | Blattner et al. |
| 2,904,335 A | 9/1959 | Rabinow |
| 2,926,392 A | 3/1960 | Jackson |
| 2,960,023 A * | 11/1960 | Greiner et al. ................. 100/152 |
| 3,022,999 A | 2/1962 | Mead |
| 3,095,343 A | 6/1963 | Berger |
| 3,362,707 A | 1/1968 | Lauren |
| 3,370,848 A | 2/1968 | Bartlett |
| 3,376,609 A | 4/1968 | Kalwaites |
| 3,566,451 A | 3/1971 | Weigand |
| 3,592,371 A | 7/1971 | Wyatt et al. |
| 3,608,024 A | 9/1971 | Yazawa et al. |
| 3,724,037 A | 4/1973 | Nicholson et al. |
| 3,737,950 A | 6/1973 | Bolliand et al. |
| 3,827,113 A | 8/1974 | Vidal et al. |
| 3,840,941 A | 10/1974 | Neveu |
| 3,860,127 A | 1/1975 | Fassman |
| 3,907,128 A | 9/1975 | Cathers |
| 3,912,258 A | 10/1975 | Martin |
| 3,966,196 A | 6/1976 | Simeth |
| 4,190,241 A * | 2/1980 | Krueger .......................... 270/47 |
| 4,319,744 A | 3/1982 | Nagel et al. |
| 4,385,757 A | 5/1983 | Muller |
| 4,514,128 A | 4/1985 | Hedrick |
| 4,640,161 A | 2/1987 | Kurk |
| 4,664,368 A | 5/1987 | Bouwens et al. |
| 4,961,805 A | 10/1990 | Siebert |
| 5,060,351 A | 10/1991 | Street |
| 5,060,929 A | 10/1991 | Kohlmann |
| 5,168,786 A | 12/1992 | Huggins et al. |
| 5,230,764 A | 7/1993 | Moll |
| 5,241,731 A | 9/1993 | Stuart |
| 5,253,762 A | 10/1993 | Duncan |
| 5,332,210 A | 7/1994 | Silverberg et al. |
| 5,355,567 A | 10/1994 | Holliday |
| 5,417,912 A * | 5/1995 | Merry ........................... 264/320 |
| 5,431,530 A | 7/1995 | Kobayashi et al. |
| 5,435,541 A | 7/1995 | Fornay et al. |
| 5,516,091 A | 5/1996 | Nakayama |
| 5,535,576 A | 7/1996 | Walintschek |
| 5,779,432 A | 7/1998 | Pena |
| 6,286,403 B1 | 9/2001 | Rosenthal et al. |
| 6,491,492 B1 | 12/2002 | Cook |
| 6,494,450 B2 | 12/2002 | Tsurumaki |
| 6,554,937 B1 | 4/2003 | Kenmochi et al. |
| 6,572,101 B2 | 6/2003 | Kaya et al. |
| 6,585,842 B1 | 7/2003 | Bompard et al. |
| 6,743,392 B2 | 6/2004 | Tanaka et al. |
| 6,780,264 B2 | 8/2004 | Nakata et al. |
| 7,156,011 B2 | 1/2007 | Morris et al. |
| 7,300,053 B2 | 11/2007 | Asano |
| 7,339,675 B2 | 3/2008 | Nishida et al. |
| 7,536,761 B2 | 5/2009 | Nestler et al. |
| 7,571,524 B2 | 8/2009 | Kawabe et al. |
| 8,100,038 B2 | 1/2012 | Sandahl |
| 8,201,429 B1 | 6/2012 | Matsunaga |
| 8,357,415 B2 | 1/2013 | Furusawa |
| 8,448,335 B2 | 5/2013 | Lundgren et al. |
| 2002/0026699 A1 | 3/2002 | Hayashi et al. |
| 2002/0148061 A1 | 10/2002 | Tanaka et al. |
| 2003/0000934 A1 | 1/2003 | Tanaka et al. |
| 2003/0127177 A1 | 7/2003 | Lane |
| 2003/0172506 A1 | 9/2003 | Guirman et al. |
| 2004/0149095 A1 | 8/2004 | Miyatake et al. |
| 2005/0005381 A1 | 1/2005 | Tanaka et al. |
| 2005/0039285 A1 | 2/2005 | Tanaka et al. |
| 2005/0066496 A1 | 3/2005 | Ames et al. |
| 2005/0097695 A1 | 5/2005 | Tanaka et al. |
| 2005/0097696 A1 | 5/2005 | Tanaka et al. |
| 2005/0132521 A1 | 6/2005 | Tanaka et al. |
| 2005/0139513 A1 | 6/2005 | Miller |
| 2005/0177967 A1 | 8/2005 | Tanaka et al. |
| 2005/0188490 A1 | 9/2005 | Tanaka et al. |
| 2005/0193514 A1 | 9/2005 | Tanaka et al. |
| 2005/0198760 A1 | 9/2005 | Tanaka et al. |
| 2005/0258589 A1 * | 11/2005 | Michler et al. ................. 271/182 |
| 2006/0005675 A1 | 1/2006 | Scheffer et al. |
| 2006/0016035 A1 | 1/2006 | Tanaka et al. |
| 2006/0016036 A1 | 1/2006 | Tanaka et al. |
| 2006/0048325 A1 | 3/2006 | Tsuchiya |
| 2006/0051434 A1 | 3/2006 | Tsuchiya |
| 2006/0101601 A1 | 5/2006 | Fujiwara et al. |
| 2006/0156876 A1 | 7/2006 | Sussmeier et al. |
| 2006/0179989 A1 | 8/2006 | James et al. |
| 2007/0068353 A1 | 3/2007 | Piucci et al. |
| 2007/0101564 A1 | 5/2007 | Nestler et al. |
| 2008/0047087 A1 | 2/2008 | Levy et al. |
| 2009/0049633 A1 | 2/2009 | Takabayashi et al. |
| 2009/0165230 A1 | 7/2009 | Tsuchiya et al. |
| 2009/0172904 A1 | 7/2009 | Tsuchiya et al. |
| 2009/0196538 A1 | 8/2009 | Liou et al. |
| 2009/0255078 A1 | 10/2009 | Wada et al. |
| 2010/0000382 A1 | 1/2010 | Maddalon |
| 2010/0015383 A1 | 1/2010 | Yamada |
| 2010/0022978 A1 | 1/2010 | Kasai et al. |
| 2010/0058907 A1 | 3/2010 | Kern |
| 2010/0122613 A1 | 5/2010 | Sandahl |
| 2010/0154156 A1 | 6/2010 | Takabayashi et al. |
| 2010/0180745 A1 | 7/2010 | Hall |
| 2011/0138942 A1 | 6/2011 | Murata |
| 2011/0296965 A1 | 12/2011 | Manek-Honninger et al. |
| 2012/0102678 A1 | 5/2012 | Junker et al. |
| 2012/0132046 A1 | 5/2012 | Supe-Dienes |
| 2012/0135227 A1 | 5/2012 | Kawabe |
| 2012/0167736 A1 | 7/2012 | Yokoe |
| 2014/0182429 A1 | 7/2014 | Saito et al. |

FOREIGN PATENT DOCUMENTS

| | | |
|---|---|---|
| JP | 45-35382 | 11/1970 |
| JP | 48-89917 | 10/1973 |
| JP | 53-45414 | 4/1978 |
| JP | 56-169873 | 12/1981 |
| JP | 61-105364 U | 7/1986 |
| JP | 3-33222 | 2/1991 |
| JP | 5-245090 | 9/1993 |
| JP | 5-279950 | 10/1993 |
| JP | 5-316909 | 12/1993 |
| JP | 8-49126 | 2/1996 |
| JP | 8-259274 | 10/1996 |
| JP | 9-111644 A | 4/1997 |
| JP | 10-110346 | 4/1998 |
| JP | 11-323718 | 11/1999 |
| JP | 2000-296083 A | 10/2000 |
| JP | 2001-246595 | 9/2001 |
| JP | 2001-288639 | 10/2001 |
| JP | 2002-069781 | 3/2002 |
| JP | 2004-223692 A | 8/2003 |
| JP | 2003-265390 A | 9/2003 |
| JP | 2003-268663 A | 9/2003 |
| JP | 2003-293236 A | 10/2003 |
| JP | 2004-238615 A | 8/2004 |
| JP | 2005-040641 A | 2/2005 |

(56) References Cited

FOREIGN PATENT DOCUMENTS

| | | |
|---|---|---|
| JP | 2005-046645 A | 2/2005 |
| JP | 2005-095665 A | 4/2005 |
| JP | 2005-111284 A | 4/2005 |
| JP | 2005-137929 A | 6/2005 |
| JP | 2005-137930 A | 6/2005 |
| JP | 2005-137931 A | 6/2005 |
| JP | 2005-144198 A | 6/2005 |
| JP | 2005-169148 A | 6/2005 |
| JP | 2005-199077 A | 7/2005 |
| JP | 2005-230573 A | 9/2005 |
| JP | 2005-237975 A | 9/2005 |
| JP | 2006-015164 A | 1/2006 |
| JP | 2006-034990 A | 2/2006 |
| JP | 2006-141483 A | 6/2006 |
| JP | 2006-152485 | 6/2006 |
| JP | 2006-166931 | 6/2006 |
| JP | 2006-265762 | 10/2006 |
| JP | 2007-002390 | 1/2007 |
| JP | 2007-029135 A | 2/2007 |
| JP | 2007-029136 A | 2/2007 |
| JP | 2007-111297 A | 5/2007 |
| JP | 2007-126810 A | 5/2007 |
| JP | 2007-135666 A | 6/2007 |
| JP | 2007-135774 A | 6/2007 |
| JP | 2007-136156 A | 6/2007 |
| JP | 2007-159612 A | 6/2007 |
| JP | 2007-209460 A | 8/2007 |
| JP | 2007-209461 A | 8/2007 |
| JP | 2007-236690 A | 9/2007 |
| JP | 2007-283086 | 11/2007 |
| JP | 2008-006260 A | 1/2008 |
| JP | 2008-119171 A | 5/2008 |
| JP | 2008-125603 A | 6/2008 |
| JP | 2009-153914 | 7/2009 |
| JP | 2010-24575 | 2/2010 |
| JP | 2011-062802 | 3/2011 |
| JP | 2011-084313 | 4/2011 |
| JP | 4675218 | 4/2011 |
| JP | 4738311 | 8/2011 |
| JP | 4878988 | 2/2012 |
| JP | 2012-115783 | 6/2012 |
| KR | 20110137660 | 12/2011 |
| WO | 2007/023965 | 3/2007 |
| WO | 2008/099733 A1 | 8/2008 |

OTHER PUBLICATIONS

Office Action mailed Apr. 27, 2015, corresponding to U.S. Appl. No. 13/749,726.

International Search Report Mailed Mar. 25, 2014, corresponds to International Application No. PCT/JP2013/085172.

International Search Report Mailed Mar. 18, 2014, corresponds to International Application No. PCT/JP2013/085177.

International Search Report Mailed Apr. 1, 2014, corresponds to International Application No. PCT/JP2013/085233.

International Search Report and Written Opinion Mailed Feb. 18, 2014, corresponds to International Application No. PCT/JP2013/085203.

International Search Report and Written Opinion Mailed Mar. 25, 2014, corresponds to International Application No. PCT/JP2013/085170.

International Search Report and Written Opinion Mailed Feb. 18, 2014, corresponds to International Application No. PCT/JP2013/085179.

* cited by examiner

METHOD OF PRODUCTION OF WEB MEMBER INCLUDING TOW

RELATED APPLICATIONS

The present application is based on, and claims priority from, Japanese Application Number 2013-002857, filed Jan. 10, 2013, the disclosure of which is hereby incorporated by reference herein in its entirety.

TECHNICAL FIELD

The present invention relates to a method of production of a web member including a tow, more particularly relates to a method of production of a web member including a tow which is cut from a continuous web member into a predetermined product length to form a product form web member in a transfer step which forms a step before transfer to a packaging step.

BACKGROUND ART

As a web member which includes a tow, for example, a cleaning-use web member which is comprised of a combination of the web member and another handle member and is used for cleaning a desktop is known (see PTL 1). Such a cleaning-use web member is comprised having a substrate sheet and a plurality of fibrous members which are laid over the substrate sheet and are integrally bonded. The fibrous members are formed from tows, that is, extremely large number of filaments (long fibers) bundled together, for example, are formed from fiber bundles which include thermoplastic fibers.

Such a cleaning-use web member comprised of a web member of a product form is formed by stacking and fastening a plurality of continuous tows on a continuous substrate sheet which advances in a conveyance direction of a production line whereby a continuous web member comprised of a substrate sheet and a plurality of tows joined together (that is, a continuous web member with no cuts) is formed, then cutting the continuous web member into a predetermined product length.

CITATIONS LIST

Patent Literature

[PTL 1] Japanese Patent Publication No. 2005-40641 A1

SUMMARY OF INVENTION

Technical Problem

In this regard, when the continuous web member is cut to thereby form a product form web member which has a predetermined product length, the product form web member is conveyed to the next step formed by the packaging step. At the time of conveyance to the packaging step, it is preferable to increase the work efficiency at the packaging step by conveying a plurality of the above product form web members stacked together.

However, the product form web members which are formed by stacking a plurality of fibrous members varies in bulk. That is, to give the product form web members a more extensive bulk of the fibrous members in the state of use so as to form structures which easily take in dust or dirt, the fibrous members are generally formed by opening (unraveling) bundles such as tows and further are joined together by just the center parts being melt bonded without the two side parts being melt bonded, so the product form web members vary in bulk.

Therefore, when, at the time of conveyance to the packaging step, a plurality of the above product form web members are stacked to form a stacked member for conveyance, for example, if the opening for insertion of the stacked member in the package which packages the stacked member is set to predetermined dimensions and a stacked member is formed with a bulk exceeding the allowable range, this will have a detrimental effect on the work efficiency in the packaging step.

The present invention, in consideration of the above problem, has as its object the provision of a method of production of a product form web member, which is formed by a continuous web member being cut and which is configured having a plurality of fibrous members which are formed from tows, which can suppress variation in the bulk of a stacked member which is formed by stacking a plurality of the above product form web members in the step of transferring the product form web members to the packaging step.

Solution to Problem

According to the aspect of the invention which is set forth in claim 1, there is provided a method of production of a web member which has a tow which has a transfer step of conveying a product form web member which has been formed by cutting a continuous web member and which is comprised having a plurality of fibrous members formed from tows to a packaging step which packages the product form web member, the transfer step having a stacking step of stacking a plurality of the product form web members to form a stacked member and a variation correction step which suppresses variation of bulk of the stacked member by pressing the stacked member from above the stacked member.

That is, in the aspect of the invention which is set forth in claim 1, in the transfer step of conveying a product form web member to transfer it to the packaging step, there is a variation correction step which suppresses variation in the bulk of a stacked member which is formed by stacking a plurality of product form web members by pressing the stacked member from above the stacked member. By this, for example, it is possible to control the bulk of the stacked member to a bulk which is suitable for the size of the opening for insertion of the stacked member in a package at the time of insertion and possible to improve the efficiency of the work in the packaging step. Further, even when a large number of product form web members which might cause an unstable balance of posture are stacked to form a stacked member, it is possible to suppress the occurrence of a situation whereby the stacked member would end up toppling over during conveyance to the packaging step.

According to the aspect of the invention which is set forth in claim 2, there is provided the method of production as set forth in claim 1 wherein the variation correction step has a pressing step of pressing the stacked member from above the stacked member by running the stacked member through a predetermined pressing path set to a predetermined height.

According to the aspect of the invention which is set forth in claim 3, there is provided the method of production as set forth in claim 2 wherein the pressing path is provided with a bulk reducing path which has an entrance which is formed at a first height and an exit which is formed at a second height which is lower than the first height and which has a top wall which extends from the entrance toward the exit at an incline and a bulk stabilizing path which continues after the bulk reducing path and extends having a predetermined length at a second height of the exit of the bulk reducing path, the first height being set to become higher than the bulk which the stacked member may have at the stacking step, while the second height being set to become lower than the bulk which the stacked member may have at the stacking step, the pressing step having a bulk reducing step of running the stacked member through the bulk reducing path to thereby reduce the bulk of the stacked member to the second height and a bulk stabilizing step of running the stacked member which has run through the bulk reducing path through the bulk stabilizing path following the bulk reducing path to thereby stabilize the bulk of the stacked member at the reduced height.

According to the aspect of the invention which is set forth in claim 4, there is provided the method of production as set forth in claim 3 wherein the variation correction step has a pressing step of pressing the stacked member from above the stacked member by using a first endless conveyor and a second endless conveyor which is arranged away from the first endless conveyor above it to continuously convey the stacked member while running it through the pressing path.

Advantageous Effects of Invention

According to the aspects of the invention which are set forth in the claims, in the transfer step of conveying a product form web member to transfer it to the packaging step, there is a variation correction step which suppresses variation in the bulk of a stacked member which is formed by stacking a plurality of product form web members by pressing the stacked member from above the stacked member. By this, the shared effects are exhibited that it possible to improve the efficiency of the work in the packaging step and it is possible to keep the stacked member from toppling over during conveyance to the packaging step.

DESCRIPTION OF EMBODIMENTS

Figure 1:
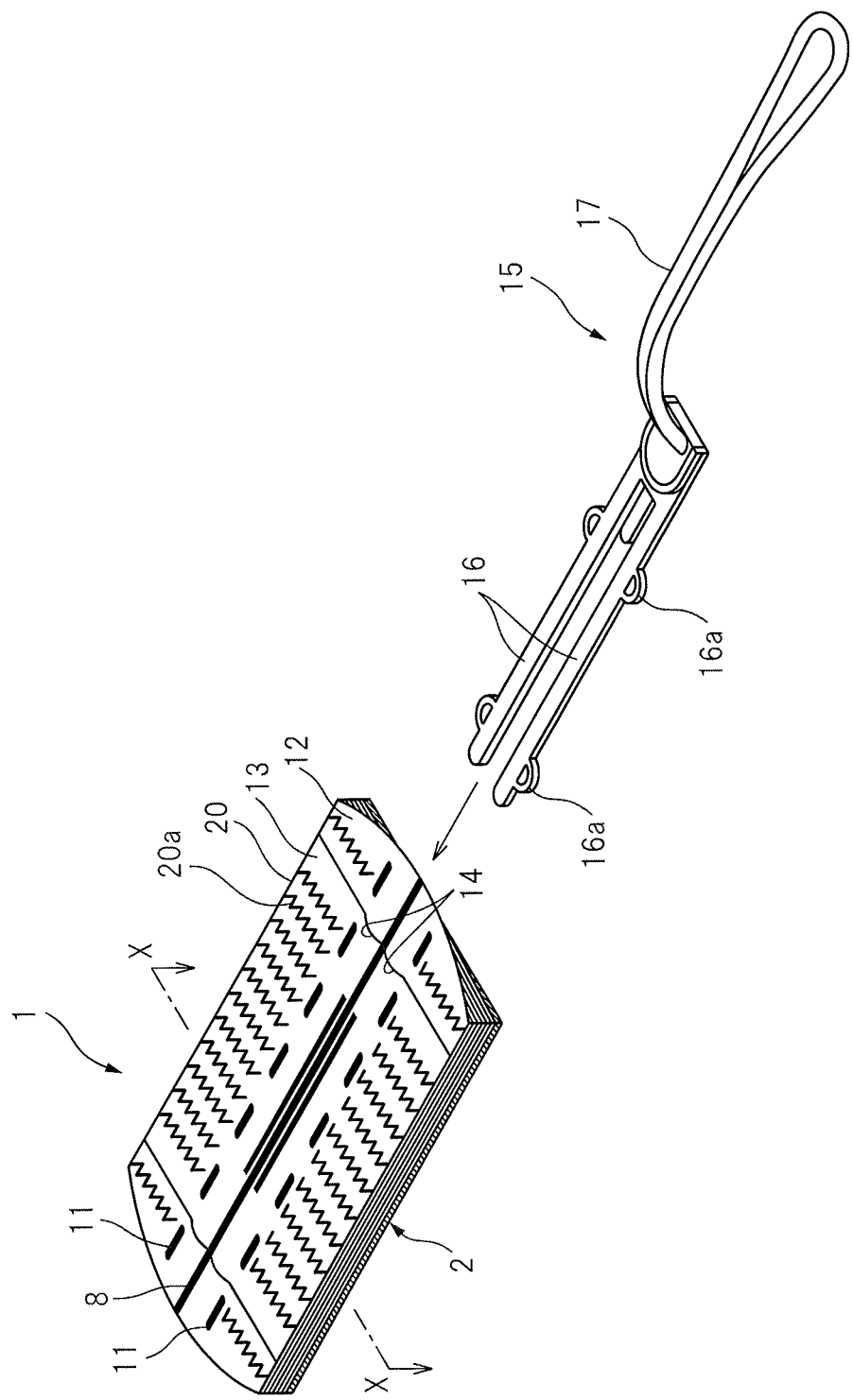
FIG. 1 is a perspective view which shows a web and handle as a whole.

First, an embodiment of the configuration of a cleaning-use web member which can be used for the method of production according to the present invention and a handle which is fastened to this cleaning-use web member will be explained with reference to FIG. 1 to FIG. 3. FIG. 1 is a perspective view which shows a cleaning-use web member 1 and handle 15 as a whole, FIG. 2 is a cross-sectional view along the line X-X of FIG. 1, and FIG. 3 is a plan view of the cleaning-use web member 1 of FIG. 1.

That is, this cleaning-use web member 1 is provided with a brush sheet 2 (shaggy part) which has a plurality of fibrous members 3, 4, 5, 6 and a sheet with slits 7 which is overlaid at the bottom part of the fibrous member 6, a substrate sheet 12 which is overlaid at the top part of the brush sheet 2, and a holding sheet 13 which is overlaid at the top part of the substrate sheet 12. Between the substrate sheet 12 and the holding sheet 13, receiving parts 14 are provided for receiving the insert parts 16 of the handle 15. Note that, the top direction in FIG. 2 will be explained as "top" and the bottom direction as "bottom".

Note that, the cleaning-use web member 1 of the present embodiment is provided with two receiving parts 14 so as to enable insertion of two branched insert parts 16. However, in other embodiments, the insert parts 16 may also be branched into three or more parts. The cleaning-use web member 1 is provided with the receiving parts 14 in accordance with the number of branches at the insert parts 16.

Figure 2:
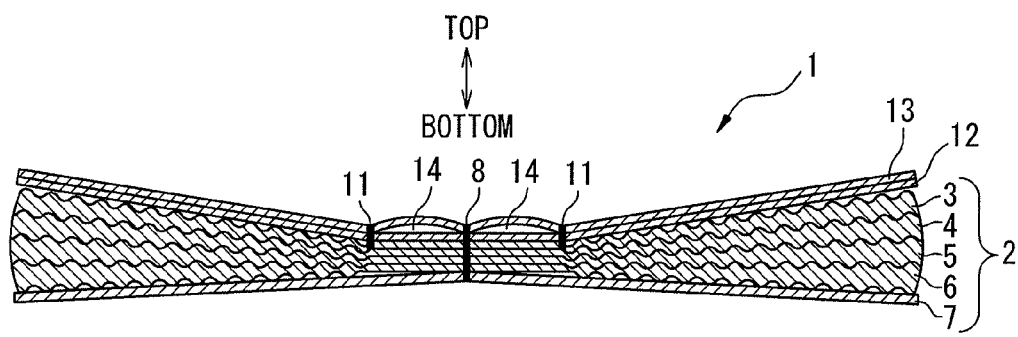
FIG. 2 is a cross-sectional view along the line X-X of FIG. 1.
Figure 3:
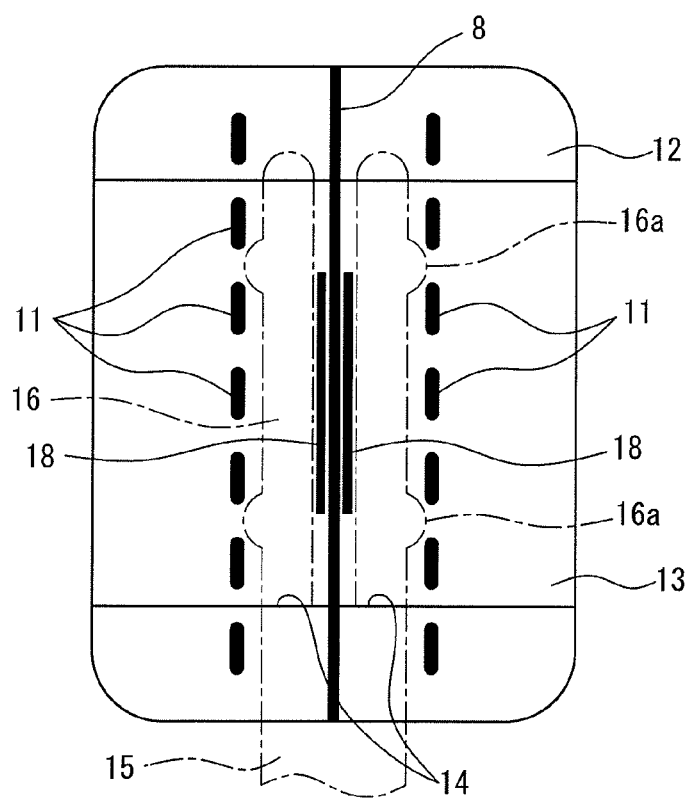
FIG. 3 is a plan view of a web member.

The brush sheet 2, in the embodiment which is shown in FIG. 2, is provided with four-layer structure fibrous members 3 to 6 comprised of a first fibrous member 3, a second fibrous member 4 which is overlaid at the bottom part of the first fibrous member 3, a third fibrous member 5 which is overlaid at the bottom part of the second fibrous member 4, and a fourth fibrous member 6 which is overlaid at the bottom part of the third fibrous member 5 and with a sheet with slits 7 which is overlaid at the bottom part of the fourth fibrous member 6 of this four-layer structure fibrous members 3 to 6. Note that, the fibrous members of the brush sheet 2 are not limited to a four-layer structure such as in the present embodiment and may also be a single layer, two-layer, three-layer, or five-layer or more structure. Further, in another embodiment, the brush sheet 2 is not provided with the sheet with slits 7.

The first fibrous member 3, second fibrous member 4, third fibrous member 5, and fourth fibrous member 6 of the brush sheet 2 are treated by dust catching oil comprised mainly of for example liquid paraffin having the action of promoting adsorption of dust, dirt, etc.

The first fibrous member 3, second fibrous member 4, third fibrous member 5, and fourth fibrous member 6 of the brush sheet 2 can be formed by opening a fiber bundle such as a tow. Note that, in the Specification, a "tow", as described in JIS L 0204-3: 1998, section 3.1.24, means a bundle of an extremely large number of filaments aligned together.

As the fiber bundle, for example, a fiber bundle comprised of thermoplastic fibers, a fiber bundle including thermoplastic fibers, etc. may be mentioned. As the material of the fibers forming the fiber bundle, for example, polyethylene, polypropylene, polyethylene terephthalate, nylon, rayon, etc. may be mentioned. As the fibers forming the fiber bundle, for example, monofilaments and composite fibers, for example, core-sheath type composite fibers or side-by-side type composite fibers etc. may be mentioned. As the composite fibers, core-sheath type composite fibers are preferable. Furthermore, core-sheath type composite fibers with a melting point of the core higher than the melting point of the sheath are more preferable from the viewpoint of thermal bondability. As core-sheath type composite fibers, core-sheath type composite fibers with a core comprised of polypropylene or polyethylene terephthalate and a sheath comprised of polyethylene are more preferable and further core-sheath type composite fibers with a core comprised of a polyethylene terephthalate and a sheath comprised of polyethylene are still more preferable.

The denier of the fibers which forms the fiber bundle is preferably 1 to 50 dtex, more preferably 2 to 10 dtex. The fiber bundle may include a plurality of types of fibers which have the same denier or may include one or more types of fibers which have different deniers.

The fiber bundle may also be a bundle of slit fibers (fibers obtained by cutting and stretching a film in an elongated manner), split fibers (fibers obtained by dividing an elongated film into a net structure), etc.

The filaments which form the fiber bundle, that is, the long fibers, are comprised of crimped fibers. By forming the filaments by crimped fibers, it is possible to increase the bulk of the fiber bundle and possible to make the crimped parts structures which easily take in dust, dirt, etc. On the other hand, depending on the conditions of the production line etc., sometimes fibers which are not crimped are suitable for use as filaments. In such a case, the filaments are formed by fibers which are not crimped.

The sheet with slits 7, in the same way as the substrate sheet 12 and holding sheet 13, is formed from a nonwoven fabric which is comprised of thermoplastic fibers (thermal bondable fibers) or a nonwoven fabric which includes thermoplastic fibers and is formed into a rectangular shape of substantially the same width and substantially the same length as the substrate sheet 12. The sheet with slits 7 is provided with sawtooth shaped slits (not shown) at predetermined intervals across the entire sheet with slits 7. Due to the slits, across the entire length of the two edge parts in the width direction of the sheet with slits 7, the two edges are formed with sawtooth shaped reed-shaped parts (not shown).

At the top part of the first fibrous member 3 of the brush sheet 2, as shown in FIG. 1 to FIG. 3, the substrate sheet 12 and the holding sheet 13 are overlaid in that order. Between the substrate sheet 12 and the holding sheet 13, receiving parts 14 are provided for insertion of insert parts 16 of the handle 15.

The substrate sheet 12 and the holding sheet 13 have rectangular shapes. The two sheets 12 and 13, as shown in FIG. 3, are set to the same dimensions in the width direction (left-right direction of FIG. 3), while the substrate sheet 12 is set longer in dimension in the length direction (up-down direction of FIG. 3). The holding sheet 13 is overlaid on the top part of the substrate sheet 12 so that two end parts of the substrate sheet 12 in the long direction stick out outward from the two ends of the holding sheet 13 in the long direction by predetermined lengths.

The substrate sheet 12 and holding sheet 13 are formed from nonwoven fabrics which are comprised of thermoplastic fibers (thermal bondable fibers) or nonwoven fabrics which include thermoplastic fibers. As thermoplastic fibers, for example, polyethylene fibers, polypropylene fibers, polyethylene terephthalate fibers, polyethylene and polyethylene terephthalate composite fibers, polyethylene and polypropylene composite fibers, core-sheath type composite fibers comprised, for example, of a core comprised of polyethylene terephthalate and a sheath comprised of polyethylene, etc. may be mentioned. As types of nonwoven fabrics, for example, thermal bond nonwoven fabrics, spunbonded nonwoven fabrics, spunlace nonwoven fabrics, etc. may be mentioned.

As other embodiments, embodiments in which the substrate sheet and the holding sheet are formed from thermoplastic resin films, for example, polyethylene films and polypropylene films, may be mentioned. Further, as further embodiments, the substrate sheet and the holding sheet are formed from laminate sheets of nonwoven fabrics and resin films.

The substrate sheet 12 and the holding sheet 13 are integrally melt bonded by a later explained first melt bonded part forming device 158 together with all of the layers of the brush sheet 2 (first fibrous member 3, second fibrous member 4, third fibrous member 5, fourth fibrous member 6, and sheet with slits 7), whereby, as shown in FIG. 1 to FIG. 3, a first melt bonded part 8 extending in the long direction at the center part in the width direction is formed. Furthermore, the substrate sheet 12 and the holding sheet 13 are integrally melt bonded at the two sides of the first melt bonded part 8 (left and right in FIG. 2) by two later explained second melt bonded part forming devices 134 together with one layer of the brush sheet 2 (first fibrous member 3), whereby two second melt bonded parts 11 are formed intermittently in the length direction. By the first fibrous member 3 being melt bonded with the substrate sheet 12 and the holding sheet 13, the first fibrous member 3 tracks movement of these sheets 12 and 13, so in the state of use, the brush sheet 2 easily becomes broader and, and in turn, the cleaning efficiency is improved.

The substrate sheet 12 and the holding sheet 13 are melt bonded at the first melt bonded part 8 with all layers of the brush sheet 2 (first fibrous member 3, second fibrous member 4, third fibrous member 5, fourth fibrous member 6, and sheet with slits 7) and is melt bonded with the first fibrous member 3 of the brush sheet 2 at the two second melt bonded parts 11. Due to this, between the substrate sheet 12 and the holding sheet 13, a pair of receiving parts 14 which are comprised of bag-shaped spaces which are defined by the first melt bonded part 8 and the two second melt bonded parts 11, which extend in the long direction of the substrate sheet 12 and the holding sheet 13, and which are open at the two ends in the long directions are provided. As a result, the receiving parts 14 can receive the insert parts 16 of the handle 15.

The substrate sheet 12 and the holding sheet 13 are melt bonded by the two second melt bonded part forming devices 134 with the first fibrous member 3 of the brush sheet 2 at the center parts of these. A pair of melt bonding lines 18 are further formed at a predetermined interval in the width direction of the substrate sheet 12 and the holding sheet 13. Between the pair of melt bonding lines 18, the first melt bonded part 8 is formed. The pair of melt bonding lines 18 are marks for management of the position of the first melt bonded part 8 at the stage of production. By managing whether the first melt bonded part 8 is arranged between the marks constituted by the pair of melt bonding lines 18 by sensors etc., it is possible to separate good products and bad products.

The two second melt bonded parts 11 are provided intermittently at several locations in the long directions of the substrate sheet 12 and the holding sheet 13. By engaging the arc-shaped projections 16a of the insert parts 16 of the handle 16 between two second melt bonded parts 11 which are aligned in the length direction and adjoin each other, the insert parts 16 of the handle 15 can be prevented from being pulled out from the receiving parts 14.

The two edge parts of the substrate sheet 12 and the holding sheet 13 in the width direction (outside parts of two second melt bonded parts 11), as shown in FIG. 1, are provided with sawtooth shaped slits 20a at predetermined intervals along the long direction. Due to the slits 20a, the two edges are provided with sawtooth shaped reed-shaped parts 20. In another embodiment, the substrate sheet 12 and the holding sheet 13 are not provided with sawtooth shaped slits 20a and therefore the reed-shaped parts 20 are not provided.

Note that the handle 15 is formed from a plastic etc. As shown in FIG. 1, it has a pair of long plate-shaped insert parts 16 which are arranged in parallel to each other, a pair of arc-shaped projections 16a which stick out from the outside surfaces of the two ends parts in the long directions of the insert parts 16, and a holder 17 which is provided integrally with one of the end parts of the insert parts 16.

By inserting the two insert parts 16 of the handle 15 inside the two receiving parts 14 of the cleaning-use web member 1 configured in this way and engaging the projections 16*a* between two second melt bonded parts 11 which are aligned in the length direction and adjoin each other, the cleaning-use web member 1 is attached to the handle 15.

Further, by holding the holder 17 of the handle 15, bringing the brush sheet 2 into contact with a location being cleaned, and making it move in the desired direction, the dust, dirt, etc. of the location being cleaned is trapped by the brush sheet 2 and the location being cleaned is cleaned.

Figure 4:
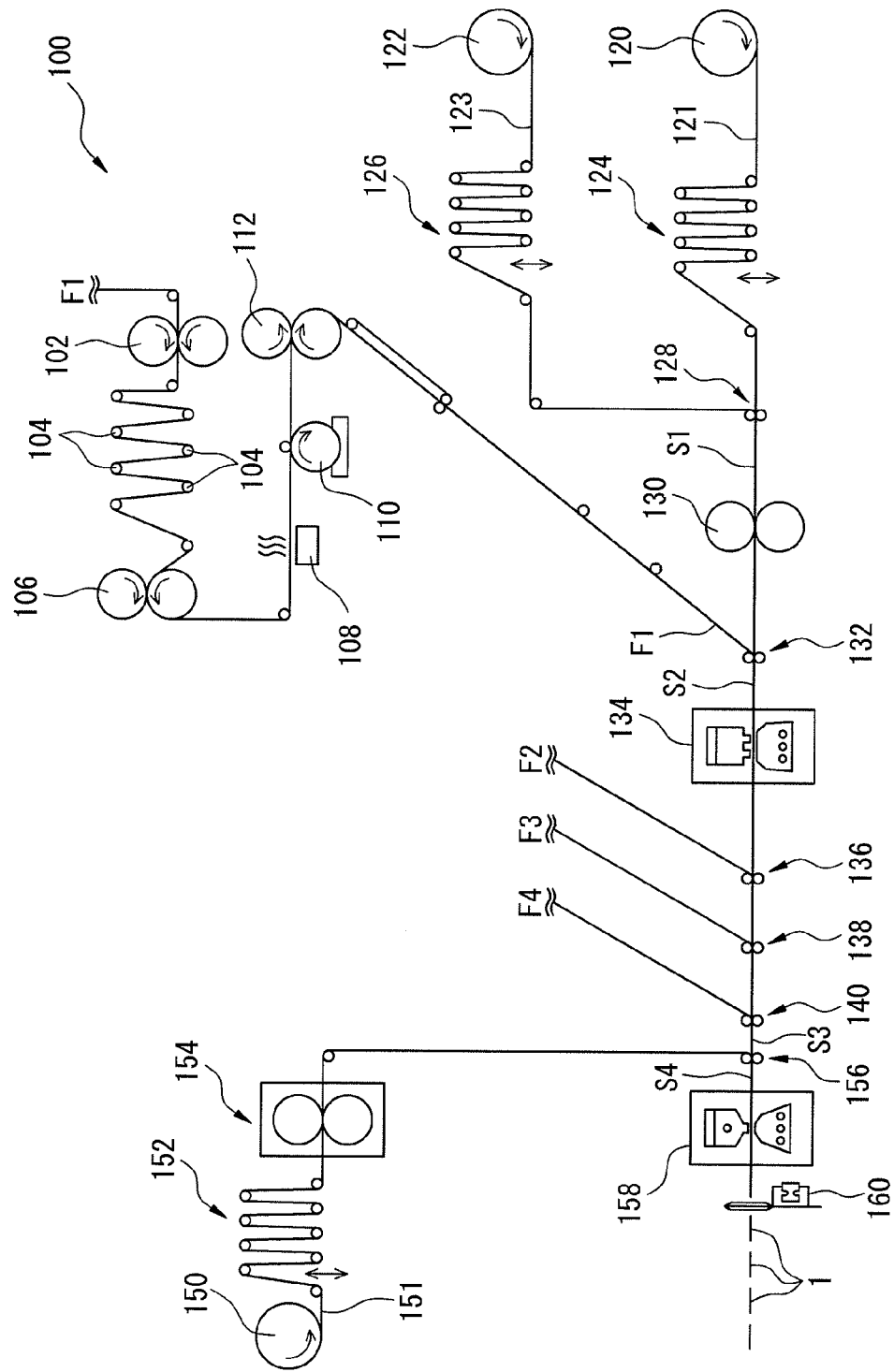
FIG. 4 is a schematic view for explaining an embodiment of a system for producing a cleaning-use web member shown in FIG. 1.

Next, the method of production of the above-mentioned cleaning-use web member 1 will be explained. FIG. 4 is a schematic view for explaining one embodiment of the production system for producing the cleaning-use web member which is shown in FIG. 1.

First, in the production system of the present embodiment, a crimped first fiber bundle F1 is taken out from a container (not shown) and is fed to first nip rolls 102. The first nip rolls 102 rotate by a certain peripheral velocity V1 whereby the first fiber bundle F1 is sent in the conveyance direction MD. After passing through the first nip rolls 102, the first fiber bundle F1 passes through the tension rolls 104 and reaches the second nip rolls 106.

The peripheral velocity V2 of the second nip rolls 106 becomes faster than the peripheral velocity V1 of the first nip rolls 102. Due to this, between these nip rolls 102 and 106, the first fiber bundle F1 is given tension. Due to this tension being imparted, the first fiber bundle F1 is opened.

Here, the tension rolls 104 are made large in mass so that self rotation is not easily caused, for example, are formed from solid bars made of steel. Due to this, sudden tension will not be applied to the first fiber bundle F1 which turns the tension rolls 104 while advancing from the first nip rolls 102 toward the second nip rolls 106.

Further, the tension rolls 104 are arranged to be able to gradually open the first fiber bundle F1 by the stroke between the first nip rolls 102 and the second nip rolls 106 becoming longer.

The first fiber bundle F1 which passes through the second nip rolls 106 passes through an air feeder 108 and oil applicator 110 and reaches third nip rolls 112. The peripheral velocity V3 of the third nip rolls 112 is slower than the peripheral velocity V2 of the second nip rolls 106. Therefore, the first fiber bundle F1 which advances between the second nip rolls 106 and the third nip rolls 112 is opened while the width of the first fiber bundle F1 is expanded to the desired extent of width.

Incidentally, the oil applicator 110 which is arranged between the second nip rolls 106 and the third nip rolls 112 performs the role of applying dust collecting oil having the action of promoting adsorption of dust, dirt, etc. to the first fiber bundle F1. The dust collecting oil is for example an oil which is mainly comprised of liquid paraffin.

The first fiber bundle F1 which passes the third nip rolls 112 proceeds to the merging part 132.

On the other hand, the nonwoven fabric 121 which forms the substrate sheet 12 is continuously unrolled from a nonwoven fabric roll 120. The nonwoven fabric 121 passes through a first roll group 124 which includes a plurality of rolls arranged in two top/bottom stages and where the dancer rolls which are positioned at the bottom stage rock up and down whereby it is intermittently conveyed. Here, "intermittently conveyed" means the nonwoven fabric 121 is repeatedly advanced by exactly a certain distance, for example, substantially the width direction length of the cleaning-use web member 1, in the machine direction, then stopped from being conveyed for a certain time. By the nonwoven fabric being intermittently conveyed in this way, it is possible to secure the time for melt bonding the component elements of the later explained multilayer web.

Similarly, the nonwoven fabric 123 which forms the holding sheet 13 is continuously unrolled from a nonwoven fabric roll 122. The nonwoven fabric 123 is passed through a second roll group 126 which includes a plurality of rolls arranged in two top/bottom stages and where the dancer rolls which are positioned at the bottom stage rock up and down whereby it is intermittently conveyed.

The nonwoven fabric 121 and the nonwoven fabric 123 merge at the merging part 128 to form a multilayer web S1. The multilayer web S1 passes the gather cutters 130 which have sawtooth shaped blades (not shown) intermittently formed at their surfaces in the peripheral direction. Due to this, the slits 20*a* which are shown in FIG. 1 are formed at the substrate sheet 12 and the holding sheet 13.

Next, at the merging part 132, the multilayer web S1 and the fiber bundle F1 merge whereby the multilayer web S2 is formed. Incidentally, the fiber bundle F1 is conveyed with a certain degree of slack between the third nip rolls 112 and merging part 132 so the fiber bundle F1 can move suitably tracking the intermittent movement of the multilayer web S1.

In the present embodiment, the two second melt bonded part forming devices 134 are used to melt bond the substrate sheet 12, holding sheet 13, and first fiber bundle F1 included in the multilayer web S2 whereby two second melt bonded parts 11 (FIG. 3) are formed. Due to this, the multilayer web S2 is melt bonded across its thickness direction. The two second melt bonded part forming devices 134, for example, are heat seal devices, ultrasonic wave sealing devices, etc. As another embodiment, ultrasonic wave sealing devices are used.

After this, at the multilayer web S2, a second fiber bundle F2 to fourth fiber bundle F4 which are opened by the same method as the first fiber bundle F1 are successively overlaid whereby a multilayer web S3 is formed.

On the other hand, the nonwoven fabric 151 is continuously unrolled from a nonwoven fabric roll 150. The nonwoven fabric 151 is passed through a third roll group 152 which includes dancer rolls and thereby intermittently conveyed and, further, passes through gather rolls 154. The gather rolls 154 have continuous sawtooth shaped blades (not shown) at their surfaces in their peripheral directions. Due to this, the nonwoven fabric 151 which passes the gather rolls 154 is formed with sawtooth shaped slits (not shown). Due to the above, the sheet with slits 7 is formed from the nonwoven fabric 151.

The sheet with slits 7 merges with the multilayer web S3 at the merging part 156 to form the multilayer web S4.

In the present embodiment, the first melt bonded part forming device 158 is used to melt bond the multilayer web S4 as a whole whereby the multilayer web S4 is formed with the first melt bonded part 8 (see FIG. 3 etc.). Due to this, the multilayer web S4 is melt bonded across its thickness direction. The first melt bonded part forming device 154 is, for example, a heat seal device, ultrasonic wave sealing device, etc. In the present embodiment, a heat seal device is used. As another embodiment, an ultrasonic wave sealing device is used.

The multilayer web S4 which passes the first melt bonded part forming device 158 and which forms a continuous web member is cut by a cutting device 160 into a predetermined product length whereby the cleaning-use web member 1, that is, a web member of the product form, is produced.

The cleaning-use web member 1 in the present embodiment includes a sheet with slits 7, but a cleaning-use web member of another embodiment does not include a sheet with slits.

Further, in the cleaning-use web member 1 of the present embodiment, the receiving parts 14 are positioned at the surface of the cleaning-use web member 1. In another embodiment, by changing the order of overlay of the substrate sheet 12 and the holding sheet 13 and the fibrous members 3 to 6, the receiving parts 14 are arranged between any adjoining fibrous members 3 to 6. Due to this, the two surfaces of the cleaning-use web member 1 can be used for cleaning. At this time, to facilitate insertion of the insert parts 16 into the receiving parts 14, the dimensions of the substrate sheet 12 and the holding sheet 13 in the long direction (up-down direction of FIG. 3) are preferably made longer than the fibrous members 3 to 6. These dimensions are suitably determined in accordance with the design specifications etc. Further, in another embodiment, the sheet with slits need not be included as a component of the cleaning-use web member or may be arranged at the two front and back surfaces of the cleaning-use web member 1.

In this regard, if the continuous web member is cut to form a product form web member which has a predetermined product length, the product form web member is conveyed to the next step of the packaging step. The packaging step is a step which packages product form web members. When conveyed to such a packaging step, it is preferable to increase the efficiency of the packaging work by stacking the plurality of the above product form web members for conveyance as preparation.

However, as explained above, at the time of conveyance to the packaging step, when conveying a plurality of product form web members stacked to form a stacked member, for example, there is a detrimental effect on the work efficiency in the packaging step if the opening for insertion use of the stacked member of the packaged member which packages the stacked member is set to predetermined dimensions and the stacked member is formed with a bulk exceeding the allowable range.

The present invention, in consideration of the above problem, has as its object to provide a method of production which can suppress variation in the bulk of a stack member which is formed by stacking a plurality of the above product form web members in a transfer step which conveys the above product form web member to a packaging step which packages it.

Figure 5:
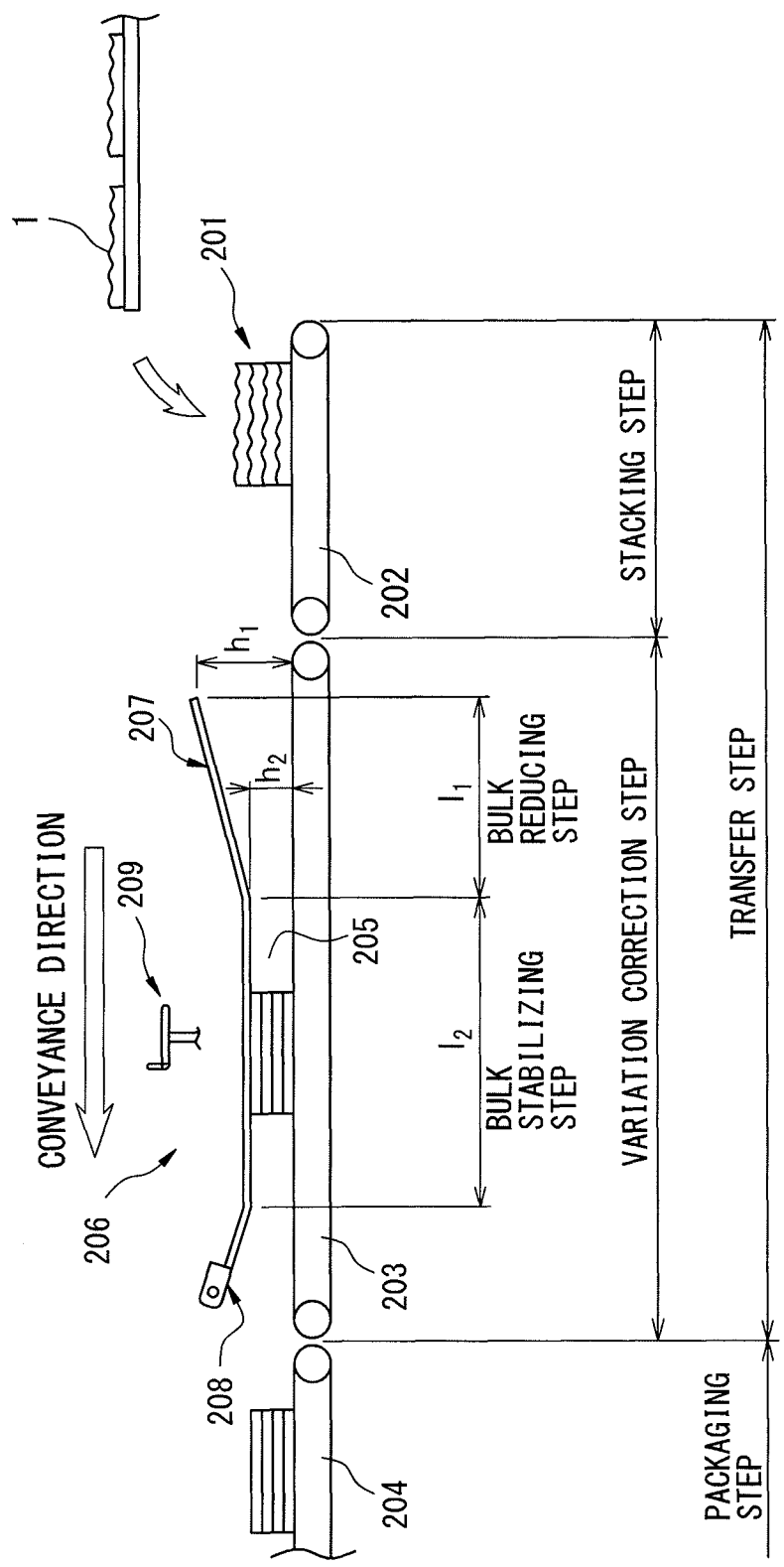
FIG. 5 is a schematic view for explaining an embodiment of a transfer step in the method of production according to the present invention.
Figure 6:
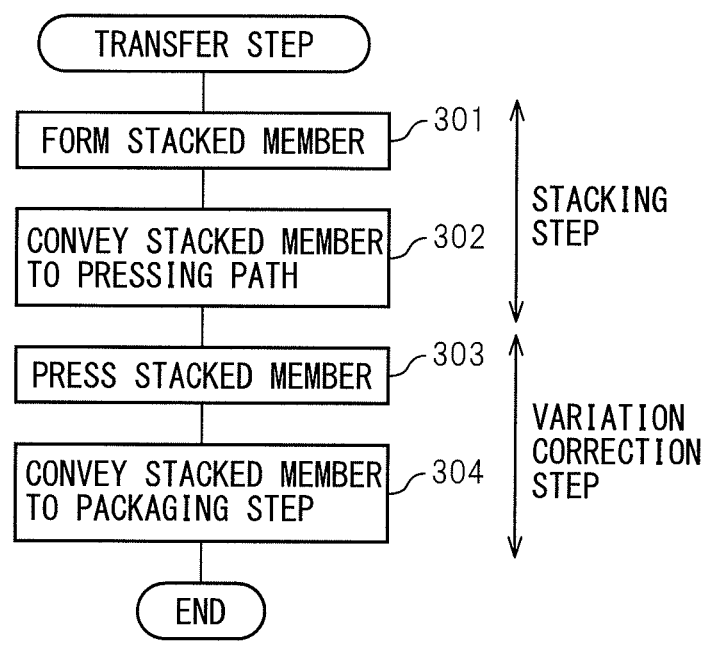
FIG. 6 is a view which shows an embodiment of the flow of work in the transfer step in the method of production according to the present invention.

FIG. 5 is a schematic view for explaining an embodiment of a transfer step in a method of production according to the present invention. In FIG. 5, 201 indicates a stacked member, 202 a first conveyor device, 203 a second conveyor device, 204 a third conveyor device, 205 a pressing path, 206 a pressing path forming device, 207 a press conveyor, 208 a power generator, and 209 a height adjustment mechanism. Incidentally, in FIG. 5, reference numeral 1 indicates a cleaning-use web similar to FIG. 1 to FIG. 4, that is, a product form web member. FIG. 6 is a view which shows an embodiment of the work flow of a transfer step in a method of production according to the present invention.

As will be understood from FIG. 5 and FIG. 6, the transfer step in the method of production according to the present invention, that is, the transfer step of conveying a product form member 1 (cleaning-use web member) which is formed by a continuous web member being cut by a cutting device 160 to transfer it to a packaging step which packages the product form web member 1, is comprised having a stacking step and a variation correction step.

As shown in FIG. 6, the stacking step is comprised having a step 301 which forms a stacked member 201 and a step 302 which follows the step 301 and which conveys the formed stacked member 201 to a later explained pressing path 205.

At the stacking step, first, step 30 forms the stacked member 201. That is, it receives product form web members 1, which are formed by a continuous web member being cut by a cutting device 160 and which drop down successively in a parabolic arc, at a first conveyor device 202. At that time, the first conveyor device 202 is controlled to be temporarily stopped until a preset predetermined number of product form web members 1 have been stacked and a stacked member 201 of the product form web members 1 has been formed.

When a stacked member 201 comprised of a predetermined number of product form web members 1 is formed, the method proceeds to the next step 302 where the stacked member 201 is conveyed to the pressing path 205. That is, the temporary stopped state of the first conveyor device 202 is lifted and the device driven to convey the formed stacked member 201 to the variation correction step.

In this way, the stacking step is comprised to intermittently drive the first conveyor device 202 to stack a predetermined number of product form web members 1 which consecutively and successively drop down in a parabolic arc so as to consecutively form stacked members 201 and, further, convey the consecutively formed stacked members to the variation correction step.

Further, in the present embodiment, during conveyance of a stacked member 201 to the pressing path 205 at step 302, the first conveyor device 202 is controlled so that the operation is repeated of the first conveyor device 202 being temporarily stopped so as to form the next stacked member 201 if a space is created on the first conveyor device 202 for forming the next stacked member 2012. In another embodiment, after the currently formed stacked member 201 finishes being conveyed to the variation correction step, that is, after the currently formed stacked member 201 is conveyed on to the second conveyor device 203, the next stacked member 201 is formed on the conveyor device 202. Furthermore, in another embodiment, the currently formed stacked member 201 is conveyed to the packaging step, that is, the currently formed stacked member 201 is conveyed on to the third conveyor device 204, then the next stacked member 201 is formed on the conveyor device 202.

As shown in FIG. 6, the variation correction step is comprised having a step 303 which presses the formed stacked member 201 and a step 304 which conveys the pressed stacked member 201 to a packaging step.

In the variation correction step, first, at step 303, the formed stacked member 201 is pressed. That is, to suppress variation in the bulk of the stacked member 201, the second conveyor device 203 and the press conveyor 207 are driven to convey the formed stacked member 201 and run it through a predetermined pressing path 205 to thereby press the stacked member 201 from above the stacked member 201.

The pressing path 205, as will be understood from FIG. 5, has an entrance which is formed at a first height (h1) and an exit which is formed at a second height (h2) which is lower than the first height (h1) and is formed provided with a bulk reducing path which extends having a predetermined length (l1) from the entrance toward the exit and has an upper wall which is inclined and a bulk stabilizing path which continues from the bulk reducing path and extends having a predetermined length (l2) at the second height (h2) of the exit of the bulk reducing path. Here, the first height (h1) is set to become higher than the bulk which the stacked member 201 can take at the stacking step, while the second height (h2) is set to become lower than the bulk which the stacked member 201 can take at the stacking step.

Further, the step 303 of the pressing step at which the stacked member 201 which is formed at step 301 is pressed is comprised of a bulk reducing step which uses the above such pressing path 205 to run a stacked member 201 through the bulk reducing path to thereby reduce the bulk of the stacked member 201 to the second height (h2) and a bulk stabilizing step which runs the stacked member 201 which has passed through the bulk reducing path through the bulk stabilizing path which follows the bulk reducing path to thereby stabilize the bulk of the stacked member 201 at the reduced height.

According to such a pressing step, since the height (h1) of the entrance of the bulk reducing path is set to a height which is higher than the bulk which the stacked member 201 which is formed at step 301 can take while the height (h2) of the exit of the bulk reducing path is set to a height which is lower than the bulk which the stacked member 201 which is formed at step 301 can take, the stacked member 201 can be pressed from above while smoothly run through the bulk reducing path so as to reduce the bulk of the stacked member 201 to the second height (h2). Furthermore, after the bulk reducing path, a bulk stabilizing path is arranged which extends having a predetermined length (l2) at the second height (h2) of the exit of the bulk reducing path so as to enable the bulk of the stacked member 201 to be stabilized at the reduced height.

After the stacked member 201 is run through the pressing path 205 which is comprised of the bulk reducing path and bulk stabilizing path so as to press the stacked member 201 and the variation of the bulk of the stacked member 201 is corrected, the method proceeds to step 304 following step 303 where the pressed stacked member 201 is conveyed to the packaging step.

The height (h1) of the entrance, the height (h2) of the exit, and the path length (l1) of the bulk reducing path of the pressing path 205 and the path length (l2) of the bulk stabilizing path are set to heights and path lengths which are determined to be suitable for correcting variation in the bulk of the stacked member 201 based on the size of the insertion openings at the packages at the time of insertion of the formed stacked members 201 or the related data of the strength of pressing and effect of suppression of variation obtained in advance by evaluation tests or analysis etc. That is, in the variation correction step in the present embodiment, a pressing path 205 which forming a space for pressing the formed stacked member 201 while passing it is formed on the second conveyor device 203, whereby the stacked member 201 is pressed without requiring a complicated pressing mechanism.

Further, in the present embodiment, the pressing path 205 is formed using a pressing path forming device 206. The pressing path forming device 206 is configured having a press conveyor 207, a power generator 208 which drives the press conveyor, and a height adjustment mechanism 209 which adjusts the positional relationship of the press conveyor 207 to the second conveyor device 203 to adjust the height of the pressing path which is formed between the press conveyor 207 and the second conveyor device 203. According to the pressing path forming device 206 which has such a configuration, the height adjustment mechanism 209 can be used to adjust the height of the pressing path to a predetermined height. Further, it is possible to press the formed stacked member 201 while making it smoothly run through the pressing path 205.

Incidentally, in the present embodiment, the step 303 and the step 304 in the variation correction step are performed by continuously driving a press conveyor 207 which is formed as an endless conveyor and similarly a second conveyor device 203 which is formed as an endless conveyor. That is, the variation correction step is configured having the step of pressing a stacked member 201 from above the stacked member 201 by using a second conveyor device 203 forming a first endless conveyor and a press conveyor 207 forming a second endless conveyor which is arranged separated from the second conveyor device above it so as to consecutively convey the stacked member 201 while running it through the predetermined pressing path 205. Such consecutive conveyance of stacked members enables a stacked member 201 to be conveyed to the packaging step faster and thereby enables greater efficiency of work. However, in another embodiment, the second conveyor device 203 and press conveyor 207 are intermittently driven so that a stacked member 201 is made to remain still at the pressing path 205 for a predetermined time. That is, for example, when limitations in layout of facilities etc. make it impossible for the path lengths to be sufficiently obtained, a stacked member 201 is made to remain still on the pressing path 205 for a predetermined time to correct variation in the bulk of the stacked member.

Above, according to the method of production of a web member having a tow according to the present invention, it is possible to realize the provision of a method of production which can suppress variation in the bulk of a stacked member which is formed by stacking a plurality of product form web members in the transfer step of conveying a product form web member to transfer it to the packaging step. Further, even when a large number of product form web members which might cause an unstable balance of posture are stacked to form a stacked member, it is possible to suppress the occurrence of a situation whereby the stacked member would end up toppling over during conveyance to the packaging step.

The present application claims the benefit of the following patent applications, the entire disclosures of which are incorporated herein by reference:
JP Patent Application No. 2012-289181 filed on Dec. 29, 2012, and US patent application claiming the priority thereof,
JP Patent Application No. 2012-289182 filed on Dec. 29, 2012, and US patent application claiming the priority thereof,
JP Patent Application No. 2012-289174 filed on Dec. 29, 2012, and US patent application claiming the priority thereof,
JP Patent Application No. 2012-289189 filed on Dec. 29, 2012, and US patent application claiming the priority thereof,
JP Patent Application No. 2012-289175 filed on Dec. 29, 2012, and US patent application claiming the priority thereof,
JP Patent Application No. 2012-289188 filed on Dec. 29, 2012, and US patent application claiming the priority thereof,
JP Patent Application No. 2012-289179 filed on Dec. 29, 2012, and US patent application claiming the priority thereof,
JP Patent Application No. 2012-289177 filed on Dec. 29, 2012, and US patent application claiming the priority thereof,
JP Patent Application No. 2012-289184 filed on Dec. 29, 2012, and US patent application claiming the priority thereof,
JP Patent Application No. 2012-289178 filed on Dec. 29, 2012, and US patent application claiming the priority thereof,
JP Patent Application No. 2012-289176 filed on Dec. 29, 2012, and US patent application claiming the priority thereof,
as well as JP Patent Application No. 2013-002855 filed on Jan. 10, 2013, and US patent application claiming the priority thereof.

The cleaning-use web member illustrated in each figure is an example of the cleaning-use web member which can be produced using the method of producing a cleaning-use web member and the system of producing a cleaning-use web member according to the present disclosure. The method of producing a cleaning-use web member and the system of producing a cleaning-use web member according to the present disclosure can be used to produce a cleaning-web member as described in, for example, Japanese Unexamined Patent Publication No. 2000-296083, 2003-265390, 2003-268663, 2004-223692, 2005-046645, 2005-095665, 2005-111284, 2005-137929, 2005-137930, 2005-137931, 2005-144198, 2005-169148, 2005-199077, 2005-230573, 2005-237975, 2006-015164, 2006-034990, 2006-141483, 2007-135774, 2007-209460, 2007-209461, 2007-029136, 2007-111297, 2007-135666, 2007-136156, 2007-159612, 2007-236690, 2008-006260, 2008-119171, and 2007-029135, the entire disclosures of which are incorporated herein by reference.

The method of producing a cleaning-use web member and the system of producing a cleaning-use web member according to the present disclosure can be used to produce a cleaning-use web member as described in, for example, U.S. Pat. No. 6,554,937B, US2002/148061A, US2003/0000934A, US2004/0149095A, US2005/0005381A, US2005/039285A, US2005/097695A, US2005/097696A, US2005/132521A, US2005/177967A, US2005/188490A, US2005/193513A, US2005/193514A, US2005/198760A, US2006/016035A, US2006/016036A, US2006/101601A, US2009/165230A and US2009/172904A, as well as US2009/049633A, US2009/255078A and US2010/154156A, the entire disclosures of which are incorporated herein by reference.

REFERENCE SIGNS LIST 201 stacked member
202 first conveyor device
203 second conveyor device
204 third conveyor device
205 pressing path
206 pressing path forming device

The invention claimed is:

1. A method of production of a web member which has a tow, said method comprising:
a transfer step of conveying a product form web member, which has been formed by cutting a continuous web member and which has a plurality of fibrous members formed from tows, to a packaging step of packaging said product form web member,
said transfer step having
a stacking step of stacking a plurality of said product form web members to form a stacked member on a first conveyor device; and
a variation correction step which suppresses variation of bulk of said stacked member by pressing said stacked member from above said stacked member while conveying said stacked member on a second conveyor device in a conveyance direction, wherein the first conveyor device and the second conveyor device are positioned side by side in the conveyance direction, and the first conveyor device is positioned upstream of the second conveyor device in the conveyance direction,
wherein said variation correction step has a pressing step of pressing said stacked member from above said stacked member by running said stacked member through a predetermined pressing path,
wherein said predetermined pressing path includes
a bulk reducing path which has an entrance at a first height and an exit at a second height which is lower than said first height and which has a top wall which inclines from said entrance toward said exit; and
a bulk stabilizing path which continues after said bulk reducing path and having a predetermined length at the second height of the exit of said bulk reducing path,
said first height being set to be higher than the bulk of said stacked member at said stacking step, while said second height being set to be lower than the bulk of said stacked member at said stacking step,
wherein said pressing step includes
a bulk reducing step of running said stacked member through said bulk reducing path to thereby reduce the bulk of said stacked member to said second height; and
a bulk stabilizing step of running said stacked member which has run through said bulk reducing path through said bulk stabilizing path following said bulk reducing path to thereby stabilize the bulk of said stacked member at the reduced height,
wherein
said second conveyor device includes a first conveyor and a second conveyor which is arranged above said first conveyor to convey said stacked member while running said stacked member through the predetermined pressing path in the conveyance direction,
the second conveyor includes the top wall which inclines from said entrance toward said exit,
the first conveyor includes a substantial flat wall which does not incline from said entrance toward said exit,
said substantial flat wall is positioned opposing to the top wall of the second conveyor and supports the stacked member in the predetermined pressing path, and
wherein
said stacking includes temporarily stopping the first conveyor device to form a next stacked member on the first conveyor device after the second conveyor device conveys said stacked member to the packaging step.

2. The method of production as set forth in claim 1, wherein the stacking step comprises
successively dropping down said product form web members on the first conveyor device in a parabolic arc to form the stacked member, and
conveying the stacked member to the variation correction step.

3. The method of production as set forth in claim 2, wherein when said product form web members are dropped down on the first conveyor device, the first conveyor device is controlled to be temporarily stopped until a preset predetermined number of said product form web members have been stacked to obtain the next stacked member.

* * * * *